United States Patent [19]

Bahr et al.

[11] Patent Number: 4,536,769

[45] Date of Patent: Aug. 20, 1985

[54] METHOD OF RECORDING INFORMATION ON AN ELECTROSENSITIVE RECORD CARRIER

[75] Inventors: Dietrich J. Bahr; Karl-Heinz Burckardt, both of Herrenberg; Gottfried Goldrian, Boblingen; Volker Rudolph, Aidlingen; Wilhelm G. Spruth, Boblingen, all of Fed. Rep. of Germany

[73] Assignee: International Business Machines Corporation, Armonk, N.Y.

[21] Appl. No.: 477,558

[22] Filed: Mar. 21, 1983

[30] Foreign Application Priority Data

Mar. 25, 1982 [EP] European Pat. Off. ............ 82102517

[51] Int. Cl.³ ............................................ G01D 15/08
[52] U.S. Cl. ...................................... 346/1.1; 346/154; 346/162; 346/163
[58] Field of Search ................. 346/154, 1.1, 162-164; 307/131, 135, 154, 52, 260, 270; 358/297-299; 340/800; 178/30; 219/121 R, 121 EC, 121 PW, 130.1, 130.32, 130.33, 130.4, 130.5, 69 C

[56] References Cited

U.S. PATENT DOCUMENTS 3,441,946  4/1969  Rudy ................................... 346/165
3,846,801  11/1974  DuMont et al. .................... 346/165

FOREIGN PATENT DOCUMENTS 0048295  3/1982  European Pat. Off. .
1548595  12/1970  Fed. Rep. of Germany .
2215519  10/1973  Fed. Rep. of Germany .
2717335  10/1978  Fed. Rep. of Germany .

Primary Examiner—E. A. Goldberg
Assistant Examiner—Frederick L. Kampe
Attorney, Agent, or Firm—Kenneth A. Seaman

[57] ABSTRACT

The invention concerns a method of recording information on an electrosensitive record carrier, preferably a record carrier covered with a metallic or metalliferous layer, by means of a print head movable relatively parallel to the surface of the record carrier and comprising at least one print electrode controllable by print pulses, and a control circuit for the timely generation of the print pulses from digital or analog signals received in such a manner that the duration and amplitude of each print current pulse are chosen so that the print process triggered by the individual print pulse is completed by the time the print pulse stops.

5 Claims, 13 Drawing Figures

TIME $t_1$

TIME $t_2 > t_1$

METHOD OF RECORDING INFORMATION ON AN ELECTROSENSITIVE RECORD CARRIER

The invention concerns a method of recording information on an electrosensitive record carrier, preferably a record carrier covered with a metallic or metalliferous layer, by means of a print head movable relatively parallel to the surface of the record carrier and comprising at least one print electrode controllable by print pulses, and a control circuit for the timely generation of the print pulses from digital or analog signals received.

Various embodiments of such methods have been known for a long time.

Thus, for example, U.S. Pat. No. 3,631,510, relates to a recording device, in which a number of finger electrodes arranged along a line are energized under clock control by a character generator. The electrosensitive paper used for this purpose consists of a first layer, (the substrate), a black epoxy resin layer covering the substrate, a second conductive layer of aluminium (or another metal of good conductivity) covering the epoxy resin layer, and finally on top of the layer of aluminium or another metal of good conductivity a layer of zinc oxide which is also conductive and constitutes an electric resistance. The electrodes rest firmly on the paper, while a large-area counter electrode, at some distance from the print electrodes, also rests on the paper, i.e., on the zinc oxide coated metallized surface. Current pulses selectively applied to the electrodes evaporate the aluminium at the contact point by resistance heating on the zinc oxide layer. To improve the visibility of the recorded dots, several pulses are applied for each dot.

A further arrangement for a recording device using electrosensitive paper is known from U.S. Pat. No. 3,441,946. The pulses applied to the input side may have substantial differences in amplitude, which may lead to different amplitudes of the print electrode. The input pulses are converted into a number of short pulses which after amplification are fed to the print electrode guided across the paper as it moves along. The operating speed of the print electrode is synchronized with the frequency of the print pulses, i.e., the output frequency of a controlling oscillator can be varied according to changing parameters, such as different scales and suitably reduced or increased speeds of the recording paper. As a result, all dots recorded on the paper are substantially comparably spaced from each other.

As the pulses used with such electrosensitive paper instantly produce satisfactory marks if their amplitude is sufficient, they may be relatively short, so that the power requirements are reduced to a minimum.

However, these are not electroerosion methods which, as is well-known, mark dots by burning the metal layer by means of an arc.

Known from German Pat. No. 848 093 is, furthermore, a recording measuring instrument with a print electrode, fixed to the instrument pointer, for recording measurement values on a metallized record carrier moved relative thereto, wherein the vapor deposited thin metal layer is burnt at the points of the marks or along the print line. Such recording is effected by electroerosion.

Finally, a method and an arrangement are known from U.S. Pat. No. 3,846,801 and its counterpart German Pat.No. 22 15 519, by means of which, using electroerosion, information is recorded on metal recording paper acting as a record carrier. The print head has a number of electrodes, and the formation of a bridge between the electrodes is avoided by the chosen ON period of the print pulses successively applied to the individual electrodes being shorter than the time after which the burn-out process ceases of its own accord. In other words, with this known method, the electrodes are switched off while they are live. For this purpose, it is indispensible for one burn-out process to be completed before the next can be started. However, switching of the live electrodes increases their wear and enhances the transport of material. As a result, the evaporated metal is deposited on the electrodes and dusty waste products deposited between them may be made conductive, so that the formation of a bridge cannot be precluded. Apart from this, the deposition of metal on the electrode tips is extremely troublesome with very thin electrodes, leading to highly undesirable traces of abrasion on the very thin aluminium layers as are generally used at present. However, for obtaining an extraordinarily high resolution of the information recorded on metallized record carriers, the methods and arrangements known so far are not so suitable.

Therefore, it is the object of the invention to provide a method, by means of which an extraordinarily high resolution is obtained, without undesirable metal being deposited at the electrodes or in their vicinity, thus avoiding the formation of a bridge. This object in accordance with the invention is accomplished by choosing the amplitude and duration of each print current pulse in such a manner that the print process triggered by the individual print pulse is completed by the time the print pulse terminates. The preferable arrangement for recording information by electroerosion on an electrosensitive record carrier covered with a metallic or metalliferous layer is to monitor the duration and amplitude of each print current pulse during the burn-out process as a function of the current flowing through the electrode and to discontinue the print pulse is in response to the termination of the current flow through the electrode which marks the end of the burn-out process.

It is particularly advantageous for the duration of the print pulses to be kept at a constant value, at which the individual print or burn-out process can be completed, in all probability, at a given magnitude and shape of the print current pulse.

One way of carrying out the invention is described in detail below with reference to the accompanying drawings, in which.

Figure 1:
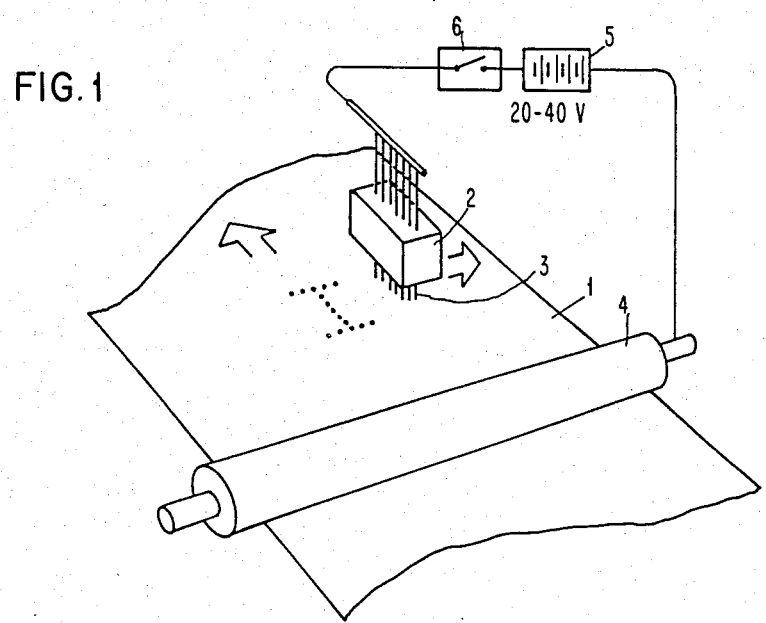
FIG. 1 is a schematic of components of an electroerosion printer.

FIG. 1 shows purely schematically the components of an electroerosion printer that are most essential for appreciating the invention. A metal-coated record carrier 1, moved, for example, in steps in the direction indicated, is positioned below a write or print head 2 which is moved in the direction marked beside the print head. In the illustrated example, the print head has a number of print electrodes 3 which are fixed to an electrode comb. In addition, the record carrier is provided with a contact roller 4 which is connected to one pole of a voltage source 5, the other pole of which may be connected to the electrodes 3 through a switch 6.

For reasons of cost and speed, the print head is generally provided with multiple print electrodes. The print quality is improved by using electrode arrangements, which are capable of printing in an overlapping manner such that the print raster element produced have a smaller dimension than the diameter of the electrodes. The size of paper area to be eroded will differ depending on the amount of overlap of each electrode over a previously printed or eroded area or element. This will be explained in greater detail with reference to FIG. 3. Switch 6 symbolically represents a control circuit, by means of which current pulses for printing are selectively applied to the individual electrodes 3.

Figure 2A:
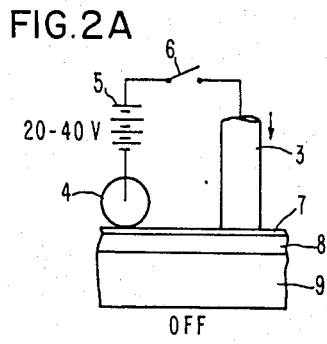
FIGS. 2A and 2B are diagrammatic representations of the burn-out process in an electroerosion printer.
Figure 2B:
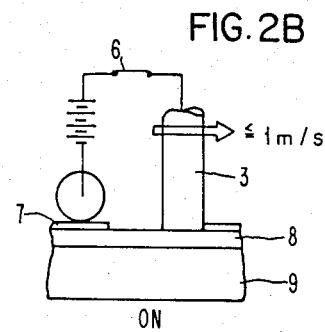

FIGS. 2A and 2B show the general operating principle of an electroerosion printer. The electrode 3 rests at a slight pressure of several grams on the record carrier 1 consisting of an aluminium layer 7, an underlying black lacquer layer 8 and a substrate 9 which is made of paper in this case. The contact roller 4, the voltage source 5 and the open switch 6 are also shown.

In FIG. 2B the switch is closed, and in aluminium layer 7 there is a highly enlarged dot that has been burnt by electrode 3 and through which the black lacquer 8 is visible.

Figure 3A:
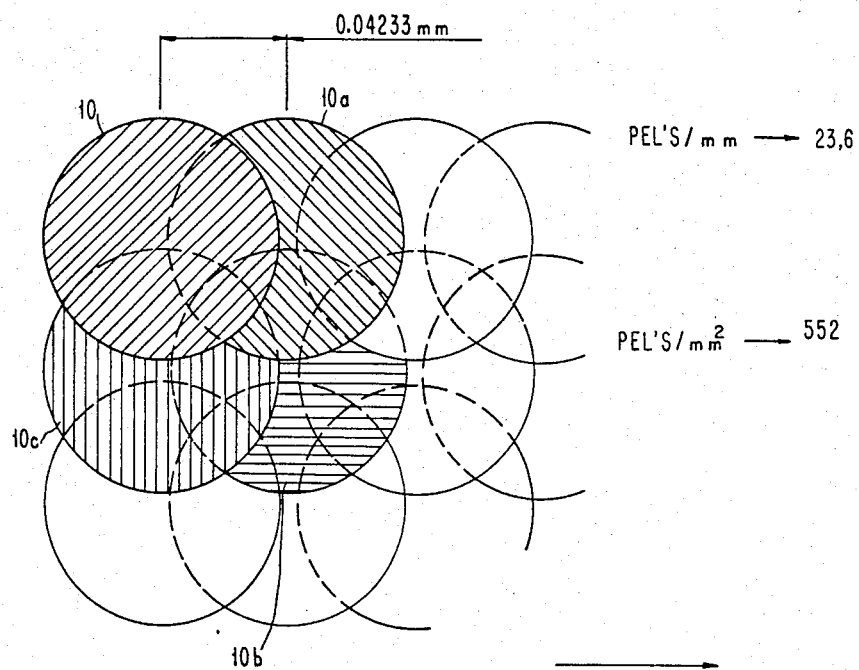
FIGS. 3A and 3B show differently enlarged shapes and sizes and dots at two different resolutions.
Figure 3B:
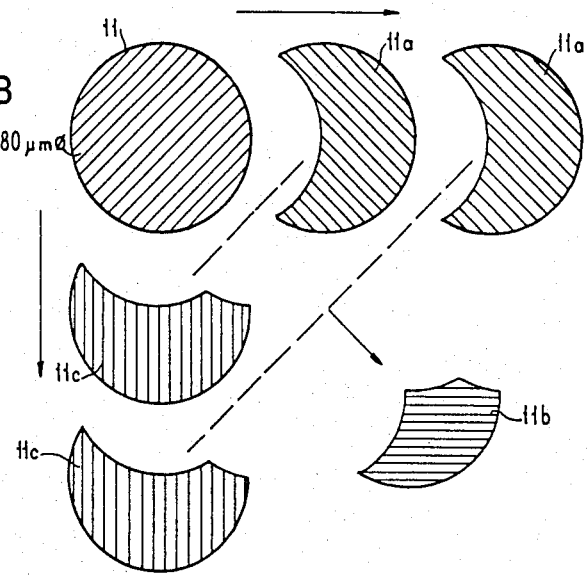

FIGS. 3A and 3B show in greater detail the conditions existing during printing. FIG. 3A depicts a very high resolution with 23.6 dots per millimeter corresponding to 600 picture elements per inch or 552 picture elements per mm² or 360 000 picture elements per square inch. The picture element or dot 10 is printed in full. Dot 10A is printed only about two thirds. Dot 10B has only about a third of the area of dot 10, whereas dot 10C is slightly larger than half the dot 10. In FIG. 3B, the dots are smaller, having a diameter of about 80 μm. Dots 11 are again printed in full, but not so dots 11A, 11B and 11C which are shown in an exploded view.

Figure 4A:
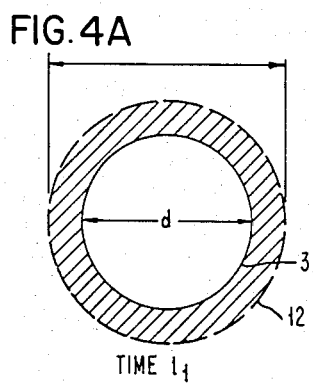
FIG. 4A is a cross-section of an electrode and the first dot inscribed by the electrode.

This is shown in a slightly different manner in FIG. 4, where the cross-section of a print electrode 3 has a diameter d. The picture element burnt by the print electrode at the time t1 or dot 12 generated by the print electrode has, by its very nature, a greater diameter than the print electrode, since the arc used for the burn-out process extinguishes after a short time.

Figure 4B:
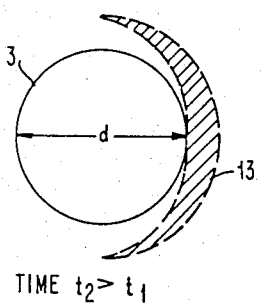
FIG. 4B shows the area subsequently inscribed by the same electrode.

FIG. 4B shows the same print electrode 3 at the time t2>t1. It will be seen that the hatched crescent-shaped area 13 has been additionally burnt. During that process, the electrode has moved in the direction of the arrow. The duration of the erosion process is, of course, correspondingly shorter.

Figure 5:
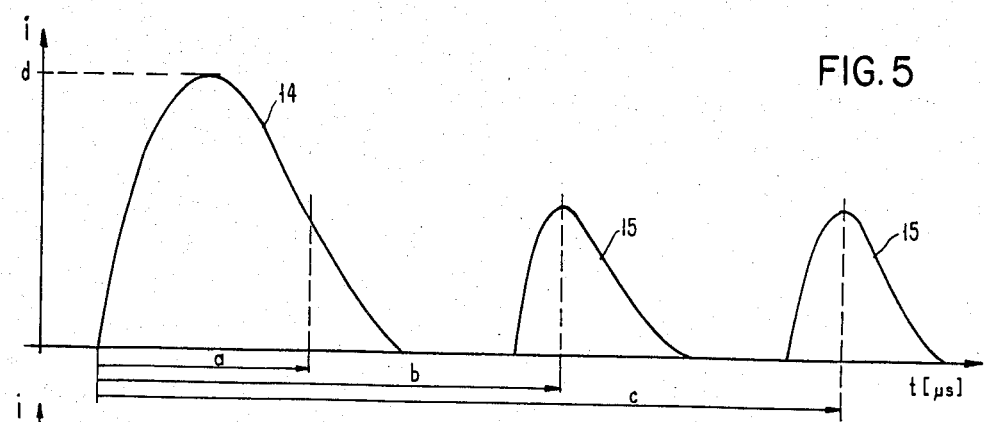
FIG. 5 is a time diagram of the print current.

To achieve this, it is first of all necessary to know what happens during such a burn-out process. FIG. 5 is a current time diagram showing the primary discharge 14 triggered by the application of a current to a print electrode 3. As the electrode moves at a speed of, say, 1 m per second, it will come across further smaller aluminium residues even after completion of the burn-out process, so that secondary discharges 15 may occur which are shown purely schematically in this case. These secondary discharges are, by their very nature, often much smaller. This applies in analogy to the illustration as a whole which is not true to scale. The arc is maintained for as long as metallic aluminium vapor favours the transfer of charge carriers. The arc extinguishes after all the aluminium has evaporated.

During the print process, burnt aluminium oxide and other combustion residues collect as non-conductive waste products between the electrodes.

At high currents metallic aluminium is also deposited on the electrode surface, so it has been necessary so far to stop the print pulses prematurely, as such deposits lead to an inferior print image.

Such a process detrimentally affects the correct shape of the individual dots and should therefore be avoided. The approach used by the invention is entirely different, as will be explained in detail below.

FIG. 5 shows furthermore three print pulse lengths, namely, print pulses a, b and c to indicate that both during the primary discharge and secondary discharges the end of the print pulse may coincide with such a discharge, leading to serious difficulties that have since been recognized.

Figure 6A:
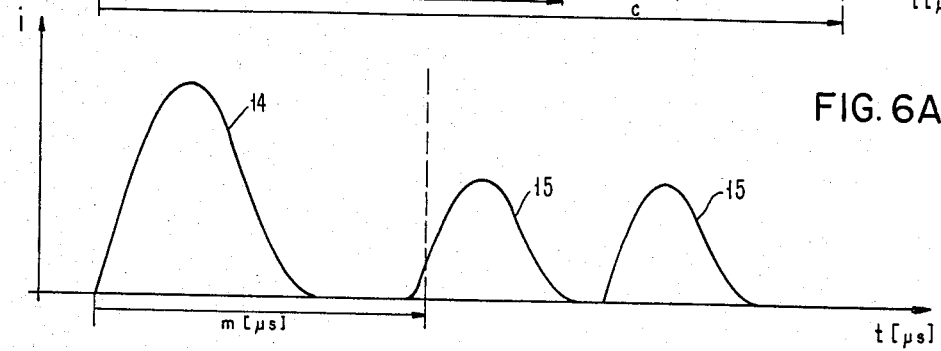
FIGS. 6A, 6B and 6C show different discharge times at a constant print pulse.
Figure 6B:
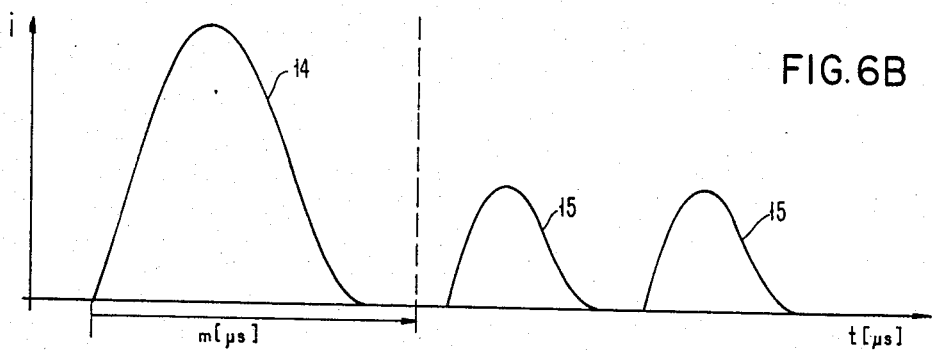
Figure 6C:
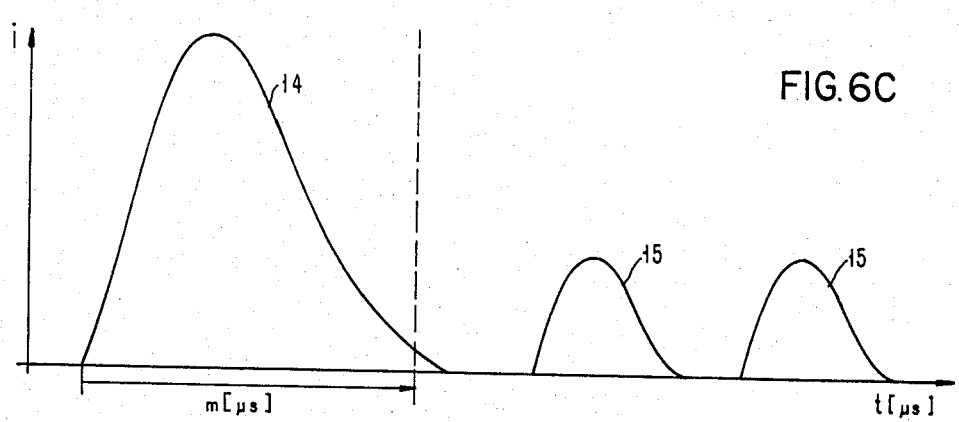
Figure 7:
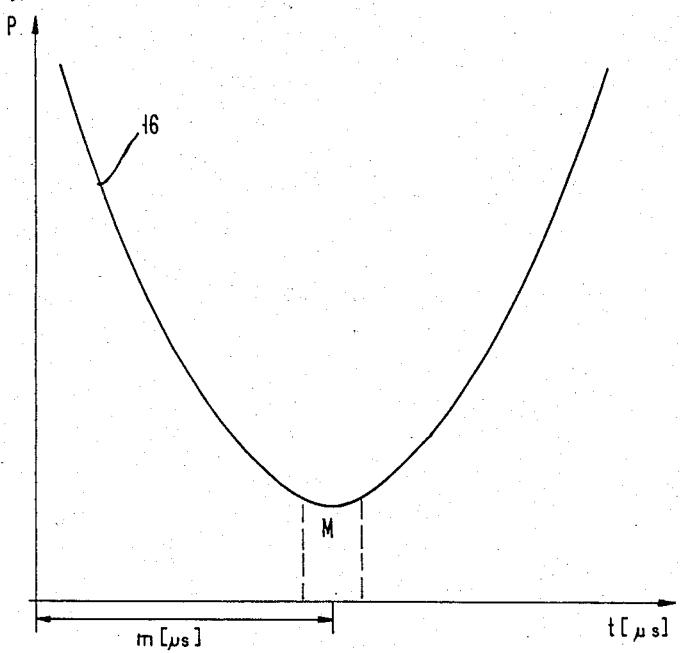
FIG. 7 is a diagram for determining the optimum print pulse length.
Figure 8:
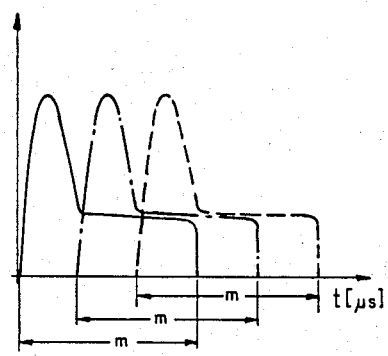
FIG. 8 is a time diagram of print pulses of the present invention.

Intensive tests carried out into such phenomena have shown that these difficulties can be avoided. One, albeit costly, solution would be to provide each electrode with a current sense circuit, by means of which the print pulse is switched off by a feedback loop when the current flow through the print electrode stops at the end of the burn-out process. This is a very precise way of ensuring that the print pulse is not switched off as long as the print electrode is live. As schematically represented in FIGS. 6A, 6B and 6C, there is indeed a slot in which a constant print pulse does not coincide with primary or secondary discharges. If the end of the print pulse is made to occur in that slot, there is very little chance of its coinciding with a primary or secondary discharge. FIG. 7 is a probability curve 16 showing purely schematically that a print pulse of the length m (microseconds) coincides with the minimum M of curve 16. It is generally known that the burn-out time of the individual dots or picture elements on a metallized record carrier has a quasi-statistical distribution, but with high-quality metallized record carriers this can be kept within such narrow limits that at the minimum of probability curve 16 there is a narrow slot in whose center the end of the print pulse to be kept constant can be made to occur.

It has been found that a duration of the print pulse thus chosen solves one of the most difficult problems encountered in high resolution electroerosion printers.

We claim:

1. A method of recording information on an electrosensitive record carrier, preferably a record carrier covered with a metallic or metalliferous layer, by means of a print head movable relatively parallel to the surface of the record carrier and comprising at least one print electrode controllable by print pulses, and a control circuit for the timely generation of the print pulses from digital or analog signals received characterized in that the duration and amplitude of each print current pulse are such that the print process triggered by the individual print pulse is completed by the time the print pulse terminates.

2. A method for recording information according to the electroerosion process on an electrosensitive record carrier covered with a metallic or metalliferous layer, by means of a print head movable relatively parallel to the surface of the record carrier and comprising at least one print electrode controllable by print pulses, and a control circuit for the timely generation of the print pulses from digital or analog signals received characterized in that the duration and amplitude of each print current pulse during the burn-out process are monitored as a function of the current flow through the electrode, and that the print pulse is discontinued in response to the termination of the current flow through the electrode marking the end of the burn-out process.

3. A method according to claim 1 or 2, characterized in that the duration of the current pulses is kept constant at a value at which the individual print or burn-out process is completed in all probability at a given strength and shape of the print current pulse.

4. A method of using a print electrode for recording on an electrosensitive record carrier by supplying printing current pulses to the print electrode including the step of selecting the duration and amplitude of each print current pulse so that the print process of the print electrode initiated by the print pulse is completed by the time the print pulse terminates.

5. A method of using a print electrode for recording as described in claim 1 or 4 wherein the duration of each print pulse is chosen to terminate non-coincident with primary or secondary discharges of the print electrode, whereby a printing process initiated by a print pulse is completed when the print pulse terminates.

* * * * *